United States Patent
Yamaguchi et al.

(10) Patent No.: US 7,943,257 B2
(45) Date of Patent: May 17, 2011

(54) ELECTROLYTE SOLVENT AND RECHARGEABLE LITHIUM BATTERY

(75) Inventors: Takitaro Yamaguchi, Yokohama (JP); Ryuichi Shimizu, Yokohama (JP); Cheol-Soo Jung, Ohsan (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 12/385,669

(22) Filed: Apr. 15, 2009

(65) Prior Publication Data
US 2010/0104949 A1 Apr. 29, 2010

Related U.S. Application Data

(62) Division of application No. 10/322,660, filed on Dec. 19, 2002.

(30) Foreign Application Priority Data

Dec. 21, 2001 (JP) .................................. 2001-388817
Dec. 6, 2002 (KR) .................................. 2002-77372

(51) Int. Cl.
*H01M 6/18* (2006.01)
*H01M 6/16* (2006.01)
(52) U.S. Cl. .......................... 429/305; 429/307; 429/326
(58) Field of Classification Search .......................... None
See application file for complete search history.

(56) References Cited

U.S. PATENT DOCUMENTS

| | | | |
|---|---|---|---|
| 4,888,255 A * | 12/1989 | Yoshimitsu et al. | 429/101 |
| 5,585,039 A | 12/1996 | Matsumoto et al. | |
| 5,712,059 A | 1/1998 | Barker et al. | |
| 5,763,119 A | 6/1998 | Adachi | |
| 5,879,834 A | 3/1999 | Mao | |
| 6,150,053 A * | 11/2000 | Murata et al. | 429/218.1 |
| 6,296,783 B1 | 10/2001 | Shindo et al. | |
| 6,307,044 B1 | 10/2001 | Dorow et al. | |
| 2002/0110735 A1 | 8/2002 | Farnham et al. | |
| 2003/0054258 A1 | 3/2003 | Ito et al. | |
| 2003/0068562 A1 | 4/2003 | Kim et al. | |
| 2003/0072996 A1* | 4/2003 | Roh | 429/144 |
| 2003/0104282 A1 | 6/2003 | Xing et al. | |
| 2003/0138703 A1 | 7/2003 | Yamaguchi et al. | |
| 2003/0157411 A1 | 8/2003 | Jung et al. | |
| 2003/0175598 A1* | 9/2003 | Otsuki et al. | 429/326 |

FOREIGN PATENT DOCUMENTS

| | | |
|---|---|---|
| JP | 07-176323 | 7/1995 |
| JP | 08-162164 | 6/1996 |
| JP | 09-251862 | 9/1997 |
| JP | 2000223150 | 8/2000 |

(Continued)

OTHER PUBLICATIONS

English translation of Korean Patent 2001-0095512, "Nonaqueous Electrolytic Solution for Batteries"; Young-Kyu Kim, Nov. 7, 2001.

(Continued)

*Primary Examiner* — Keith Walker
(74) *Attorney, Agent, or Firm* — Robert E. Bushnell, Esq.

(57) ABSTRACT

Disclosed is a rechargeable lithium battery including a positive electrode and a negative electrode in which lithium intercalations occurs, and an electrolyte including a low-inflammability solvent with a heat of combustion of 19,000 kJ/kg or less, and a lithium salt.

20 Claims, 1 Drawing Sheet

FOREIGN PATENT DOCUMENTS

| | | |
|---|---|---|
| JP | 2001-143750 | 5/2001 |
| JP | 2001-185213 | 7/2001 |
| JP | 2003-007336 | 1/2003 |
| KR | 1020010095512 | 11/2001 |
| WO | WO 01/29920 | 4/2001 |
| WO | WO0221631 * | 3/2002 |

OTHER PUBLICATIONS

The Examiner's Answers of the parent application dated Jan. 19, 2011, U.S. Appl. No. 10/322,660.
The Examiner's Answers of the Parent U.S. Appl. No. 10/322,660, dated Jan. 19, 2011.

* cited by examiner

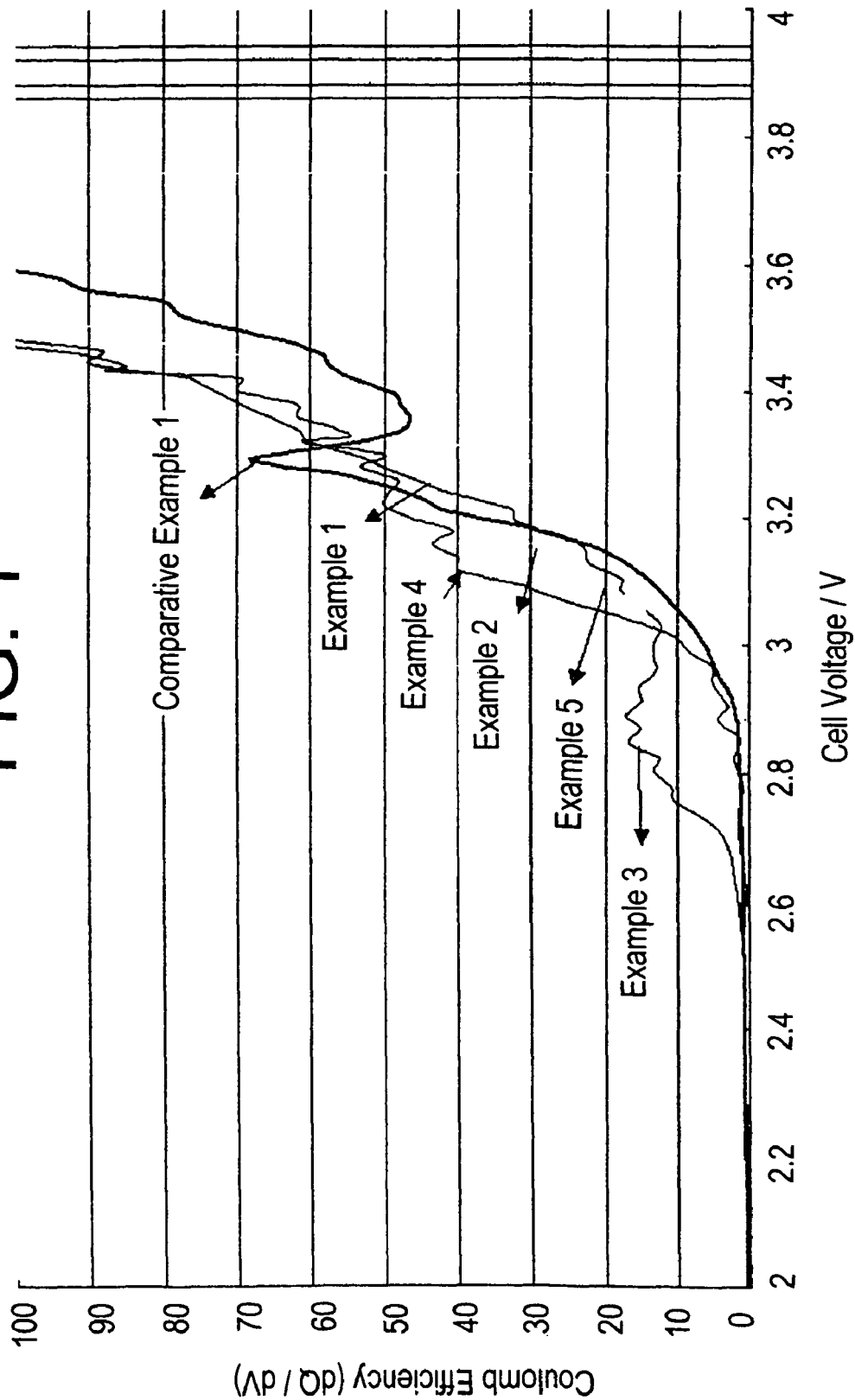

ELECTROLYTE SOLVENT AND RECHARGEABLE LITHIUM BATTERY

CLAIM OF PRIORITY

This application makes reference to, incorporates the same herein, and claims all benefits accruing under 35 U.S.C. §119 from applications for ELECTROLYTE AND RECHARGEABLE LITHIUM BATTERY earlier filed in the Japan Patent Office on the 21 Dec. 2001 and there duly assigned Serial No. 2001-388817, and for ELECTROLYTE AND RECHARGEABLE LITHIUM BATTERY earlier filed in the Korean Industrial Property Office on the 6 Dec. 2002 and there duly assigned Serial No. 2002-77372. Furthermore, this application is a divisional of Applicants' Ser. No. 10/322,660 filed in the U.S. Patent & Trademark Office on 19 Dec. 2002, and assigned to the assignee of the present invention.

BACKGROUND OF THE INVENTION

1. Field of the Invention

The present invention relates to an electrolyte and a rechargeable lithium battery, and more particularly, to a rechargeable lithium battery exhibiting good safety and discharge characteristics.

2. Description of the Related Art

Rechargeable lithium batteries have high working voltages and energy densities, and they exhibits good low-temperature performance. These advantages facilitate the increasing demands of portable electronics.

A rechargeable lithium battery includes an electrolyte including organic solvents. The organic solvents have a low flash point and high inflammability, so this battery has a shortcoming in that combustion can be caused by overcharging or heating it. Recently, attempts to use a mixture of an ester of formic acid including a halogen and a cyclic carbonic ester, a mixture of an ester of formic acid including a halogen and an ester halide, or a phosphoric ester as the organic solvent have been made, since these mixtures have self-fire extinguishing characteristics.

However, with the use of these organic solvents it is impossible to obtain sufficient discharge capacity, and they cause deterioration of the cycle life characteristics. These results are considered to occur because of the decomposition of the ester of formic acid including the halogen and phosphoric ester on a surface of the negative electrode. Such decomposition causes generation of gas and denaturing of the electrolyte, thereby deteriorating discharge capacity and cycle life characteristics.

SUMMARY OF THE INVENTION

It is an object of the present invention to provide an electrolyte that can provide a rechargeable lithium battery with good safety, discharge capacity, and cycle life characteristics.

It is another object to provide a rechargeable lithium battery including the electrolyte.

These and other objects may be achieved by an electrolyte including a low-inflammability solvent with a heat of combustion of 19,000 kJ/kg or less, and a lithium salt.

In order to achieve these objects and others, the present invention provides a rechargeable lithium battery including a positive electrode, a negative electrode, and the electrolyte. The positive and negative electrodes are capable of intercalating and deintercalating lithium.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a graph illustrating coulomb efficiency at initial charge of lithium cells according to Examples 1 to 5 of the present invention, and Comparative Example 1.

DETAILED DESCRIPTION OF THE PREFERRED EMBODIMENTS

The electrolyte of the present invention includes a low-inflammability solvent with a heat of combustion of 19,000 kJ/kg or less, and it may further include a non-aqueous solvent. The amount of low-inflammability solvent is 1 volume % or more, and preferably 5 to 80 volume % based on the total solvent. If the amount of the low-inflammability solvent is less than 1 volume %, the desired effect cannot be realized.

The low-inflammability solvent with a heat of combustion of 19,000 kJ/kg prevents combustion of the battery caused by overcharging or internal short circuits.

The low-inflammability solvent exhibits no flash point at a boiling temperature of the solvent or less under a flash point test of the Japanese Industrial Standard (JIS)-K-2265. Such a low-inflammability solvent can greatly improve safety of the battery.

The electrolyte of the present invention may further include a polyacrylate compound, and it may further include both the polyacrylate compound and acrylonitrile. The polyacrylate compound preferably includes at least three acryl groups. At the initial charge of the battery, the polyacrylate compound polymerizes to form an organic layer on a surface of a negative electrode. Such an organic layer prevents decomposition of the electrolyte which results in decreases in gas generation and denaturation of the electrolyte, thereby improving the charge and discharge capacity and cycle life characteristics. The amount of the polyacrylate compound is preferably 0.01 to 10 wt %.

The low-inflammability solvent is preferably a benzene halide, an acetonitrile halide, an anhydrous halide, a phosphonitric trimer halide, a phosphonate halide, or a butane substituted with two chlorides and five fluorides. Such halides have a low heat of combustion and self-fire extinguishing characteristics, improving safety of the battery.

The electrolyte of the present invention may further include antimony oxide. The antimony oxide is an inorganic flame-retardant and it helps to further decrease the heat of combustion of the electrolyte without a decrease of the capacity, so that it prevents overheating from overcharging.

The benzene halide is preferably represented by Formula 1.

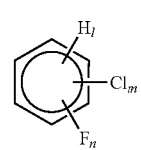

<Formula 1>

(where l+m+n=6 and (m+n)≧4; and preferably l+m+n=6, m+n=3, and m≧2)

The acetonitrile halide is preferably represented by Formula 2.

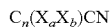
$C_n(X_aX_b)CN$ <Formula 2>

(where a and b are integers, a+b=2n+1; b>0; n is 1 or 2; $X_a$ is at least one selected from H, F, or Cl; and $X_b$ is at least one selected from F or Cl.)

The anhydrous halide is preferably represented by one selected from the group consisting of Formulas 3 to 7.

<Formula 3>
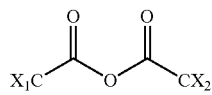

(where $X_1$ and $X_2$ are the same or different; they are at least one selected from the group consisting of H, F, and Cl, and at least one of $X_1$ and $X_2$ is at least one selected from the group consisting of F and Cl.)

<Formula 4>
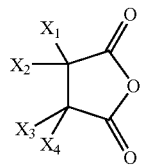

(where $X_1$ to $X_4$ are the same or different; they are at least one selected from the group consisting of H, F, and Cl; and at least one of $X_1$ to $X_4$ is at least one selected from the group consisting of F and Cl.)

<Formula 5>
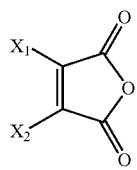

(where $X_1$ and $X_2$ are the same or different; they are at least one selected from the group consisting of H, F, and Cl, and at least one of $X_1$ and $X_2$ is at least one selected from the group consisting of F or Cl.)

<Formula 6>
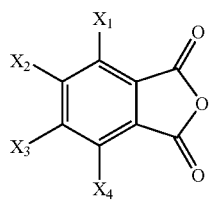

(where $X_1$ to $X_4$ are the same or different; they are at least one selected from the group consisting of H, F, and Cl; and at least one of $X_1$ to $X_4$ is at least one selected from the group consisting of F and Cl.)

<Formula 7>
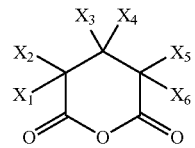

(where $X_1$ to $X_6$ are the same or different; they are at least one selected from the group consisting of H, F, and Cl; and at least one of $X_1$ to $X_6$ is at least one selected from the group consisting of F and Cl.)

The phosphonitric trimer halide is preferably represented by Formula 8.

<Formula 8>
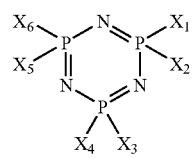

(where $X_1$ to $X_6$ are the same or different; they are at least one selected from the group consisting of H, F, and Cl; and at least one of $X_1$ to $X_6$ is at least one selected from the group consisting of F and Cl.)

The phosphonate halide is preferably represented by Formulas 9 or 10.

<Formula 9>
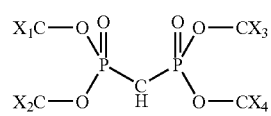

(where $X_1$ to $X_4$ are the same or different; they are at least one selected from the group consisting of H, F, and Cl; and at least one of $X_1$ to $X_4$ is at least one selected from the group consisting of F and Cl.)

<Formula 10>
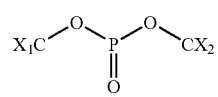

(where $X_1$ to $X_2$ are the same or different; they are at least one selected from the group consisting of H, F, and Cl; and at least one of $X_1$ and $X_2$ is at least one selected from the group consisting of F and Cl.)

The butane substituted with two chlorides and five fluorides is represented by Formulas 11 or 12.

$CF_3CF_2CHCl_2$ <Formula 11>

$CClF_2CF_2CHClF$ <Formula 12>

The antimony oxide as the inorganic flame-retardant is represented by Formula 13.

$Sb_nO_m$ <Formula 13>

(where n is 2, and m is 3 to 5.)

A rechargeable lithium battery of the present invention will now be illustrated.

The rechargeable lithium battery includes a positive electrode, a negative electrode, and an electrolyte. The positive electrode and the negative electrode are capable of intercalating or deintercalating lithium, and the electrolyte includes a low-inflammability solvent with a heat of combustion of 19,000 kJ/kg or less, and it may further include a non-aqueous solvent. At this time, the amount of low-inflammability solvent is 1 volume % or more, and preferably 5 to 80 volume % to based on the total solvent. If the amount of the low-inflammability solvent is less than 1 volume %, the desired effect cannot be realized.

The low-inflammability solvent with a heat of combustion of 19,000 kJ/kg or less prevents combustion of the battery caused by overcharging or internal short circuits because it exhibits no flash point at a boiling temperature of the solvent or less under a flash point test of the Japanese Industrial Standard (JIS)-K2265. Such a low-inflammability solvent can greatly improve safety of the battery.

The electrolyte of the present invention may further include a polyacrylate compound, and it may further include both the polyacrylate compound and acrylonitrile. The polyacrylate compound preferably includes at least three acryl groups. At an initial charge of the battery, the polyacrylate compound polymerizes to form an organic layer on a surface of the negative electrode, and such an organic layer prevents the decomposition of the electrolyte which results in decreases in gas generation and denaturation of the electrolyte, thereby improving the charge and discharge capacity and cycle life characteristics. The amount of the polyacrylate compound is preferably 0.01 to 10 wt %, and the amount of acrylonitrile is preferable 0.001 to 10 wt %.

The low-inflammability solvent is preferably a benzene halide, an acetonitrile halide, an anhydrous halide, a phosphonitric trimer halide, a phosphonate halide, or a butane substituted with two chlorides and five fluorides. Such halides have a low heat of combustion and are self-fire extinguishing, improving safety of the battery.

The electrolyte of the present invention further may include antimony oxide. The antimony oxide is an inorganic flame-retardant and it helps to further decrease heat of combustion of the electrolyte without a decrease of the capacity so that it prevents overheating by overcharging.

The benzene halide is preferably represented by Formula 1

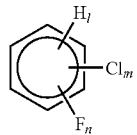

<Formula 1>

(where l+m+n=6 and (m+n)≧4; and preferably l+m+n=6, m+n=3, and m≧2)

The acetonitrile halide is preferably represented by Formula 2.

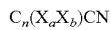

$C_n(X_a X_b)CN$      <Formula 2>

(where a and b are integers, a+b=2n+1; b>0; n is 1 or 2; $X_a$ is at least one selected from H, F, or Cl; and $X_b$ is at least one selected from F or Cl.)

The anhydrous halide is preferably represented by one selected from the group consisting of Formulas 3 to 7.

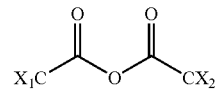

<Formula 3>

(where $X_1$ and $X_2$ are the same or different; they are at least one selected from the group consisting of H, F, and Cl, and at least one of $X_1$ and $X_2$ is at least one selected from the group consisting of F and Cl.)

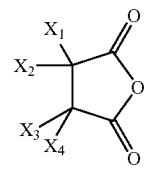

<Formula 4>

(where $X_1$ to $X_4$ are the same or different; they are at least one selected from the group consisting of H, F, and Cl; and at least one of $X_1$ to $X_4$ is at least one selected from the group consisting of F and Cl.)

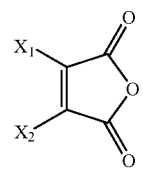

<Formula 5>

(where $X_1$ and $X_2$ are the same or different; they are at least one selected from the group consisting of H, F, and Cl, and at least one of $X_1$ and $X_2$ is at least one selected from the group consisting of F or Cl.)

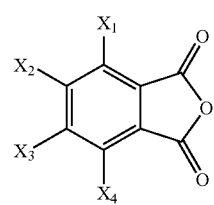

<Formula 6>

(where $X_1$ to $X_4$ are the same or different; they are at least one selected from the group consisting of H, F, and Cl; and at least one of $X_1$ to $X_4$ is at least one selected from the group consisting of F and Cl.)

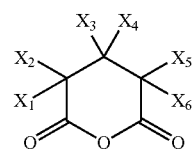

<Formula 7>

(where $X_1$ to $X_6$ are the same or different; they are at least one selected from the group consisting of H, F, and Cl; and at least one of $X_1$ to $X_6$ is at least one selected from the group consisting of F and Cl.)

The phosphonitric trimer halide is preferably represented by Formula 8.

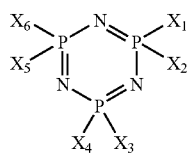
<Formula 8>

(where $X_1$ to $X_6$ are the same or different; they are at least one selected from the group consisting of H, F, and Cl; and at least one of $X_1$ to $X_6$ is at least one selected from the group consisting of F and Cl.)

The phosphonate halide is preferably represented by Formulas 9 or 10.

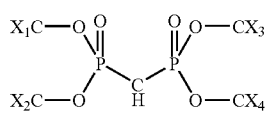
<Formula 9>

(where $X_1$ to $X_4$ are the same or different; they are at least one selected from the group consisting of H, F, and Cl; and at least one of $X_1$ to $X_4$ is at least one selected from the group consisting of F and Cl.)

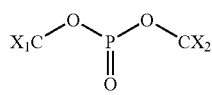
<Formula 10>

(where $X_1$ to $X_2$ are the same or different; they are at least one selected from the group consisting of H, F, and Cl; and at least one of $X_1$ and $X_2$ is at least one selected from the group consisting of F and Cl.)

The butane substituted with two chlorides and five fluorides is represented by Formulas 11 or 12.

   $CF_3CF_2CHCl_2$    <Formula 11>

   $CClF_2CF_2CHClF$    <Formula 12>

The antimony oxide as the inorganic flame-retardant is represented by Formula 13.

   $Sb_nO_m$    <Formula 13>

(where n is 2, and m is 3 to 5.)

A rechargeable lithium battery preparation will now be illustrated. The method is applied to an electrolyte including a low-inflammability solvent and a polyacrylate compound.

The electrolyte is placed between a positive electrode and a negative electrode to prepare an electrode element, wherein the positive electrode and the negative electrode include active materials which are capable of intercalating and deintercalating lithium. The electrolyte includes the low-inflammability solvent with a heat of combustion of 19,000 kJ/kg or less, the polyacrylate compound, and a lithium salt. The polyacrylate compound has preferably at least three acryl groups.

The positive active material may be at least one lithiated intercalation compound including lithium, and at least one selected from the group consisting of cobalt, manganese, and nickel.

The low-inflammability solvent with a heat of combustion of 19,000 kJ/kg or less prevents combustion of the battery caused by overcharging or internal short circuit. In addition, at the initial charge of the rechargeable lithium battery, the polyacrylate compound is polymerized to form an organic layer on the surface of the negative electrode. Such an organic layer prevents decomposition of the electrolyte which results in decreases in gas generation and denaturation of the electrolyte, thereby improving the charge and discharge capacity and cycle life characteristics.

Subsequently, the method may further include heating the electrolyte placed between the electrodes at a temperature of between 40 and 120° C. According to the heat-treating, the polyacrylate compound is thermo-polymerized to form a polymer electrolyte, and the polyacrylate compound is adhered to the surface of the negative electrode to form a uniform organic layer.

The amount of the polyacrylate compound added to the electrolyte is preferably 0.01 to 10 wt %.

The low-inflammability solvent exhibits no flash point at a boiling temperature of the solvent or less under a flash point test of the Japanese Industrial Standard (JIS)-K2265. Such low-inflammability solvent can greatly improve safety of the battery.

The low-inflammability solvent preferably includes a benzene halide, an acetonitrile halide, an anhydrous halide, a phosphonitric trimer halide, a phosphonate halide, or a butane substituted with two chlorides and five fluorides. Such halides have a low heat of combustion and are self-fire extinguishing, improving safety of the battery.

The electrolyte of the present invention may further include antimony oxide. The antimony oxide is an inorganic flame-retardant and it helps to further decrease heat of combustion of the electrolyte without a decrease of capacity so that it prevents to overheating by overcharging.

The benzene halide is preferably represented by Formula 1.

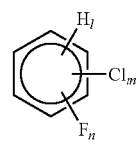
<Formula 1>

(where l+m+n=6 and (m+n)≧4; and preferably l+m+n=6, m+n=3, and m≧2)

The acetonitrile halide is preferably represented by Formula 2.

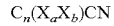   $C_n(X_aX_b)CN$    <Formula 2>

(where a and b are integers, a+b=2n+1; b>0; n is 1 or 2;

$X_a$ is at least one selected from H, F, or Cl; and $X_b$ is at least one selected from F or Cl.)

The anhydrous halide is preferably one selected from compounds represented by Formulas 3 to 7.

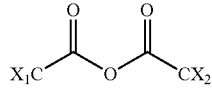

<Formula 3>

(where $X_1$ and $X_2$ are the same or different; they are at least one selected from the group consisting of H, F, and Cl, and at least one of $X_1$ and $X_2$ is at least one selected from the group consisting of F and Cl.)

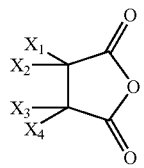

<Formula 4>

(where $X_1$ to $X_4$ are the same or different; they are at least one selected from the group consisting of H, F, and Cl; and at least one of $X_1$ to $X_4$ is at least one selected from the group consisting of F and Cl.)

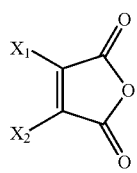

<Formula 5>

(where $X_1$ and $X_2$ are the same or different; they are at least one selected from the group consisting of H, F, and Cl, and at least one of $X_1$ and $X_2$ is at least one selected from the group consisting of F or Cl.)

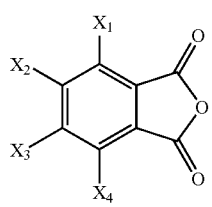

<Formula 6>

(where $X_1$ to $X_4$ are the same or different; they are at least one selected from the group consisting of H, F, and Cl; and at least one of $X_1$ to $X_4$ is at least one selected from the group consisting of F and Cl.)

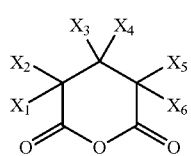

<Formula 7>

(where $X_1$ to $X_6$ are the same or different; they are at least one selected from the group consisting of H, F, and Cl; and at least one of $X_1$ to $X_6$ is at least one selected from the group consisting of F and Cl.)

The phosphonitric trimer halide is preferably represented by Formula 8.

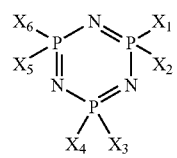

<Formula 8>

(where $X_1$ to $X_6$ are the same or different; they are at least one selected from the group consisting of H, F, and Cl; and at least one of $X_1$ to $X_6$ is at least one selected from the group consisting of F and Cl.)

The phosphonate halide is preferably represented by Formulas 9 or 10.

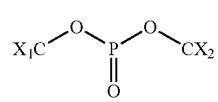

<Formula 9>

(where $X_1$ to $X_4$ are the same or different; they are at least one selected from the group consisting of H, F, and Cl; and at least one of $X_1$ to $X_4$ is at least one selected from the group consisting of F and Cl.)

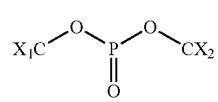

<Formula 10>

(where $X_1$ to $X_2$ are the same or different; they are at least one selected from the group consisting of H, F, and Cl; and at least one of $X_1$ and $X_2$ is at least one selected from the group consisting of F and Cl.)

The butane substituted with two chlorides and five fluorides is represented by Formulas 11 or 12.

$CF_3CF_2CHCl_2$  <Formula 11>

$CClF_2CF_2CHClF$  <Formula 12>

The antimony oxide as the inorganic flame-retardant is represented by Formula 13.

$Sb_nO_m$  <Formula 13>

(where n is 2, and m is 3 to 5.)

Hereinafter, the preferred embodiment of the present invention will be described.

The rechargeable lithium battery of the present invention includes a positive electrode, a negative electrode, and an electrolyte. The positive electrode and the negative electrode are capable of intercalating or deintercalating lithium. The electrolyte includes a low-inflammability solvent with a heat of combustion of 19,000 kJ/kg or less, and a lithium salt. The electrolyte preferably further includes a polyacrylate compound, and further may include both the polyacrylate compound and acrylonitrile. The polyacrylate compound preferably includes at least three acryl groups.

The positive electrode includes, for example, those formed by mixing a positive active material and a binder such as polyvinylidene fluoride, and a conductive agent such as carbon black, and shaping it into a sheet or a circle form. Examples of the positive active material include at least one lithiated intercalation compound including lithium, and at least one selected from the group consisting of cobalt, manganese, and nickel. Specifically, it is preferably $LiMn_2O_4$, $LiCoO_2$, $LiNiO_2$, $LiFeO_2$, or $V_2O_5$. It further comprises a compound such as TiS, MoS, an organic disulfide compound, or an organic polysulfide compound, which is capable of reversible intercalation and deintercalation of lithium ions.

The negative electrode includes, for example, those formed by mixing a negative active material powder and a binder such as polyvinylidene fluoride, and optionally a conductive agent such as carbon black, and shaping it into a plane circle. Examples of the negative active material include a carbonaceous material such as artificial graphite, natural graphite, carbon fiber graphite, graphite meso carbon microbeads, and amorphous carbon, a metal capable of alloying with lithium, and any mixture including the metal and carbonaceous material. Metals capable of alloying with lithium include Al, Si, Sn, Pb, Zn, Bi, In, Mg, Ga, and Cd. Further, a metal lithium foil may also be used as a negative electrode.

The polyacrylate compound according to the present invention is polymerized to form a polymer electrolyte comprising an electrolytic organic solution, as well as to form an organic layer on the surface of the negative electrode. In this case, the polymer electrolyte is produced by immersing the low-inflammability solvent and the lithium salt in a polymer derived from the polyacrylate compound, and an organic layer from the polyacrylate compound is formed on the surface of the negative electrode. Alternatively, the polyacrylate compound may only be used to form an organic layer on the surface of the negative electrode. In this case, the electrolyte includes the low-inflammability solvent and the lithium salt.

The organic layer preferably includes the polyacrylate compound as well as acrylonitrile to improve ionic-conductivity of the organic layer and to decrease internal impedance of the battery, thereby improving charge and discharge efficiency.

A high content of the polyacrylate compound in the electrolyte makes a polymer electrolyte solution, and a low content of the polyacrylate compound makes an organic electrolytic solution.

The polyacrylate compound of the present invention is represented by one formula selected from the group consisting of Formulas 14 to 16, it has at least three carbon-carbon double bonds in the molecules, and it is an acrylic ester derivative with at least three functional groups. The polyacrylate compound is an anion-polymerizable monomer which is capable of radical polymerization to generate the polymer electrolyte by heating. When the polyacrylate compound is heated, anion polymerization is initiated, wherein 3 or more carbon-carbon double bonds are opened is in a molecule and each is bound to other polyacrylate molecules in a chain reaction. As a result, the organic layer is formed on the surface of the negative electrode by polymerizing the polyacrylate compound.

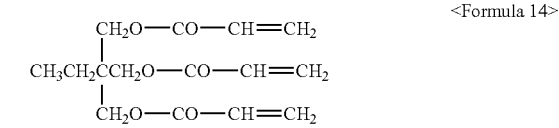

<Formula 14>

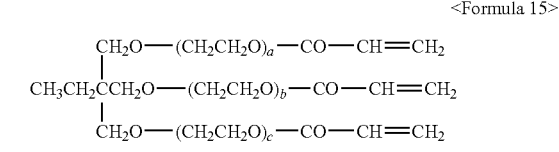

<Formula 15>

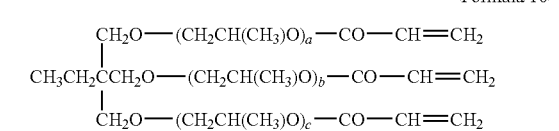

<Formula 16>

(where $0 \leq a \leq 15$, $0 \leq b \leq 15$, $0 \leq c \leq 15$, and $3 \leq (a+b+c) \leq 15$.)

The polyacrylate compound preferably has a dipentaerythritol structure represented by Formula 17, and it more preferably includes six acryl groups represented by Formula 18.

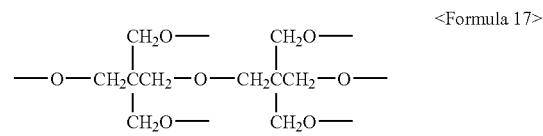

<Formula 17>

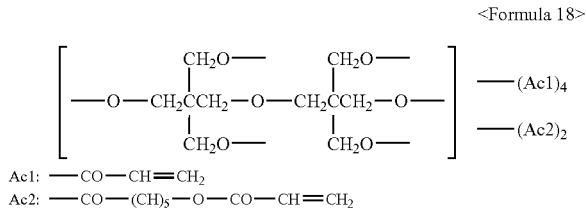

<Formula 18>

The organic layer according to the present invention may also include acrylonitrile in addition to the polyacrylate compound. Similar to the case including the polyacrylate compound alone, anion polymerization occurs on the surface of the negative electrode having a low voltage during the charge, so that the organic layer is coated on the negative electrode.

Although a detailed structure thereof has not been demonstrated, it is hypothesized to be a copolymer of the polyacrylate compound and acrylonitrile. The organic layer has a high ion conductivity of lithium, and it is a durable layer that resists electrolysis under severe conditions such as when applying 4.2V or more. The formation of the organic layer allows a decrease in the concentration of the unreacted polyacrylate compound in the electrolyte. Thus, the remaining monomer does not deteriorate the battery performance.

The organic layer is very thin, having a thickness in the order of between several and scores of nm. If the thickness is in the order of several, it is hard for the lithium ions to permeate the layer so that the charge and discharge reaction is difficult to carry out. When the thickness is less than 1 nm, it is not preferable since the shape of the layer is not maintained.

It is considered that the organic layer is formed on the surface of the powder of the carbonaceous negative active material or lithium foil.

Since the organic layer is formed on the surface of the negative electrode, it prevents the negative electrode from directly contacting the electrolyte. Accordingly, a reductive decomposition of electrolyte is inhibited on the surface of the negative electrode, so the gas generated by decomposition of the electrolyte is decreased and the electrolyte is not denatured. As a result of decreasing the gas generation, the inner pressure of the battery is not increased, so the battery is not deformed. Also, by preventing the denaturation of electrolyte, the amount of electrolyte is not decreased. Since the charge and discharge reaction is smoothly carried out, the charge and discharge efficiency is increased and the cycle characteristics are improved.

As the reaction between the electrolyte and the negative electrode is suppressed, the electrolyte is not denatured and the battery performance factors such as charge and discharge efficiency and cycle characteristics are not deteriorated even when the battery is stored for a long time at a high temperature. Therefore, when using the electrolyte of the present invention including the low-inflammability solvent with good safety, and the negative electrode including the organic layer, direct contact between the low-inflammability solvent and the negative electrode can be prevented thereby improving charge and discharge capacity.

Since the organic layer has high ion conductivity, it acts to deliver lithium ions between the electrolyte and the negative electrode. Although the surface of the negative electrode is coated with the organic layer, it does not inhibit the movement of lithium ions so the charge and discharge reaction occurs smoothly, and the charge and discharge efficiency is thereby increased and the cycle characteristics are improved. In addition, the internal impedance of the battery is not increased and the charge and discharge capacity is improved.

The polyacrylate compound is preferably added to the electrolyte in a range of between 0.1 and 10 wt % prior to forming the organic layer.

If the content of the polyacrylate compound is less than 0.1 wt %, it is not preferable since the organic layer is insufficiently formed. Whereas if the content is more than 10 wt %, the organic layer is overly thick so that the impedance is inevitably increased.

The electrolyte of the present invention includes a low-inflammability solvent with a heat of combustion of 19,000 kJ/kg or less, and a lithium salt. The heat of combustion of the low-inflammability solvent is preferably 0 to 19,000 kJ/kg, and more preferably 0 to 14,000 kJ/kg. The low-inflammability solvent with the heat of combustion of 19,000 kJ/kg or less reduces the produced heat of decomposition under overcharging or internal short circuit to make combustion difficult, thereby improving safety of the battery.

An example of the low-inflammability solvent with the heat of combustion of 19,000 kJ or less may be a benzene halide represented by Formula 1, an acetonitrile halide represented by Formula 2, an anhydrous halide represented by one of Formulas 3 to 7, a phosphonitric trimer halide represented by Formula 8, a phosphonate halide represented by Formulas 9 to 10, or a butane substituted with two chlorides and five fluorides represented by Formulas 11 or 12.

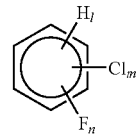

<Formula 1>

(where l+m+n=6 and (m+n)≧4; and preferably l+m+n=6, m+n=3, and m≧2)

$$C_n(X_aX_b)CN$$ <Formula 2>

(where a and b are integers, a+b=2n+1; b>0; n is 1 or 2;
$X_a$ is at least one selected from H, F, or Cl; and
$X_b$ is at least one selected from F or Cl.)

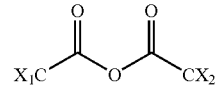

<Formula 3>

(where $X_1$ and $X_2$ are the same or different; they are at least one selected from the group consisting of H, F, and Cl, and at least one of $X_1$ and $X_2$ is at least one selected from the group consisting of F and Cl.)

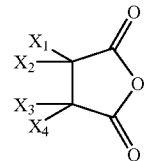

<Formula 4>

(where $X_1$ to $X_4$ are the same or different; they are at least one selected from the group consisting of H, F, and Cl; and at least one of $X_1$ to $X_4$ is at least one selected from the group consisting of F and Cl.)

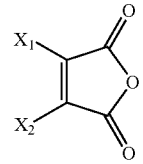

<Formula 5>

(where $X_1$ and $X_2$ are the same or different; they are at least one selected from the group consisting of H, F, and Cl, and at least one of $X_1$ and $X_2$ is at least one selected from the group consisting of F or Cl.)

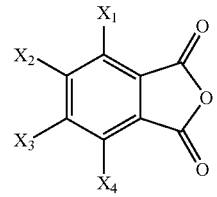

<Formula 6>

(where $X_1$ to $X_4$ are the same or different; they are at least one selected from the group consisting of H, F, and Cl; and at least one of $X_1$ to $X_4$ is at least one selected from the group consisting of F and Cl.)

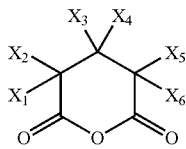
<Formula 7>

(where $X_1$ to $X_6$ are the same or different; they are at least one selected from the group consisting of H, F, and Cl; and at least one of $X_1$ to $X_6$ is at least one selected from the group consisting of F and Cl.)

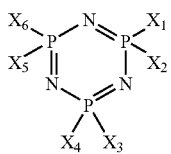
<Formula 8>

(where $X_1$ to $X_6$ are the same or different; they are at least one selected from the group consisting of H, F, and Cl; and at least one of $X_1$ to $X_6$ is at least one selected from the group consisting of F and Cl.)

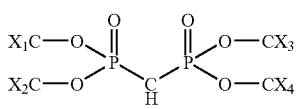
<Formula 9>

(where $X_1$ to $X_4$ are the same or different; they are at least one selected from the group consisting of H, F, and Cl; and at least one of $X_1$ to $X_4$ is at least one selected from the group consisting of F and Cl.)

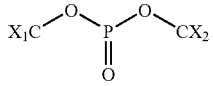
<Formula 10>

(where $X_1$ to $X_2$ are the same or different; they are at least one selected from the group consisting of H, F, and Cl; and at least one of $X_1$ and $X_2$ is at least one selected from the group consisting of F and Cl.)

$CF_3CF_2CHCl_2$ <Formula 11>

$CClF_2CF_2CHClF$ <Formula 12>

Such halides have a low heat of combustion, so the safety of the battery is improved.

The low-inflammability solvent exhibits no flash point at a boiling temperature of the solvent or less under a flash point test of the Japanese Industrial Standard (JIS)-K2265. Such low-inflammability solvent can greatly improve safety of the battery. The heat of combustion of the benzene halide, the anhydrous halide, the phosphonitric trimer halide, and the phosphonate halide are presented in Tables 1 to 5, respectively. As shown in Tables 1 to 4, the heat of combustion is varied according to the structure of the compound even though the compound belongs to the same category, e.g. a benzene halide. In the present invention, the low-inflammability solvent with the heat of combustion of 19,000 kJ/kg, and preferably 14,000 kJ/kg, is selected from among the solvents shown in Tables 1 to 4.

TABLE 1

<benzene halide>

| | Molecular Formula | Heat of combustion (kJ/kg) |
|---|---|---|
| Benzene | $C_6H_6$ | 41,831 |
| Fluorobenzene | $C_6H_5F$ | 32,235 |
| Difluorobenzene | $C_6H_4F_2$ | 25,649 |
| Trifluorobenzene | $C_6H_3F_3$ | 20,857 |
| Tetrafluorobenzene | $C_6H_2F_4$ | 17,214 |
| Pentafluorobenzene | $C_6HF_5$ | 14,350 |
| Hexafluorobenzene | $C_6F_6$ | 13,133 |
| Chlorobenzene | $C_6H_5Cl$ | 27,744 |
| Dichlorobenzene | $C_6H_4Cl_2$ | 20,246 |
| Trichlorobenzene | $C_6H_3Cl_3$ | 15,595 |
| Tetrachlorobenzene | $C_6H_2Cl_4$ | 12,382 |
| Pentachlorobenzene | $C_6HCl_5$ | 10,093 |
| Hexachlorobenzene | $C_6Cl_6$ | 8,340 |
| Chlorofluorobenzene | $C_6ClFH_4$ | 24,016 |
| Chloropentafluorobenzene | $C_6ClF_4H$ | 16,195 |
| Chlorotetrafluorobenzene | $C_6ClF_3H_2$ | 17,578 |
| Dichlorodifluorobenzene | $C_6Cl_2F_2H_2$ | 19,260 |
| Dichlorotetrafluorobenzene | $C_6Cl_2F_4$ | 16,679 |
| Dichlorofluorobenzene | $C_6Cl_2FH_3$ | 14,268 |
| Dichlorotrifluorobenzene | $C_6Cl_2F_3H$ | 15,366 |
| Pentachlorofluorobenzene | $C_6Cl_5F$ | 9,906 |
| Tetrachlorodifluorobenzene | $C_6Cl_4F_2$ | 11,170 |
| Trichlorodifluorobenzene | $C_6Cl_3F_2H$ | 13,488 |
| Trichlorofluorobenzene | $C_6Cl_3FH_2$ | 14,524 |
| Trichlorotrifluorobenzene | $C_6Cl_3F_3$ | 12,611 |

TABLE 2

<Anhydrous halide>

| | Molecular Formula | Heat of Combustion (kJ/kg) |
|---|---|---|
| Acetic anhydride | | |
| $(CBr_3CO)_2O$ | $C_4O_3Br_6$ | 2,270 |
| $(CCl_3CO)_2O$ | $C_4O_3Cl_6$ | 3,837 |
| $(CF_3CO)_2O$ | $C_4O_3F_6$ | 5,936 |
| Succinic anhydride | | |
| $(CBr_2CO)_2O$ | $C_4O_3Br_4$ | 2,916 |
| $(CCl_2CO)_2O$ | $C_4O_3Cl_4$ | 4,917 |
| $(CF_2CO)_2O$ | $C_4O_3F_6$ | 6,950 |
| Succinic anhydride | | |
| $(CBrCO)_2O$ | $C_4O_3Br_2$ | 5,185 |
| $(CClCO)_2O$ | $C_5O_3Cl_2$ | 7,422 |
| $(CFCO)_2O$ | $C_5O_3F_2$ | 9,714 |
| Glutaric anhydride | | |
| $(CBr_2)_3(CO)_2O$ | $C_5O_3Br_6$ | 2,758 |
| $(CCl_2)_3(CO)_2O$ | $C_5O_3Cl_6$ | 4,917 |
| $(CF_2)_3(CO)_2O$ | $C_5O_3F_6$ | 7,247 |
| Phthalic anhydride | | |
| $C_6Br_4(CO)_2O$ | $C_8O_3Br_4$ | 6,389 |
| $C_6Cl_4(CO)_2O$ | $C_8O_3Cl_4$ | 9,951 |
| $C_6F_4(CO)_2O$ | $C_8O_3F_4$ | 13,406 |

TABLE 3

<Phosphonitric trimer halide>

| | Molecular formula | Heat of Combustion (kJ/kg) |
|---|---|---|
| $(PN)_3(OCH_3)_6$ | $C_6H_{18}O_6N_3P_3$ | 18,078 |
| $(PN)_3H_6$ | $H_6N_3P_3$ | 20,307 |
| $(PN)_3F_6$ | $N_3F_6P_3$ | 6,121 |
| $(PN)_3Cl_6$ | $N_3Cl_6P_3$ | 4,784 |
| $(PN)_3Br_6$ | $N_3Br_6P_3$ | 3,185 |

TABLE 4

Phosphonate halide

| | Molecular formula | Heat of Combustion (kJ/kg) |
|---|---|---|
| $(CH_3)_4(O_2PO)_2CH_2$ | $C_5H_{14}O_6P_2$ | 17,877 |
| $(CF_3)_4(O_2PO)_2CH_2$ | $C_5H_2O_6F_{12}P_2$ | 9,904 |
| $(CCl_3)_4(O_2PO)_2CH_2$ | $C_5H_2O_6Cl_{12}P_2$ | 3,985 |
| $(CBr_3)_4(O_2PO)_2CH_2$ | $C_5H_2O_6Br_{12}P_2$ | 2,312 |

Such halides have a lower heat of combustion than the conventional solvent shown in Table 5, and they exhibit a self-extinguishing property, so they can improve safety of the battery.

TABLE 5

<Conventional organic solvent used in the electrolyte>

| | Molecular formula | Heat of Combustion (kJ/kg) |
|---|---|---|
| Ethylene carbonate | $C_3H_4O_3$ | 14,965 |
| Diethyl carbonate | $C_5H_{10}O_3$ | 24,114 |
| Propylene carbonate | $C_4H_6O_3$ | 18,970 |
| Ethylmethyl carbonate | $C_4H_8O_3$ | 21,082 |
| Dimethyl carbonate | $C_3H_6O_3$ | 17,131 |
| γ-butyrolactone | $C_4H_6O_2$ | 23,994 |

In addition, when antimony oxide represented by Formula 13 is added to the electrolyte, it further reduces the heat of combustion of the electrolyte so that it prevents the explosive increase in heat in the battery during overcharging. The mechanism of the prevention of the increase in the heat is that the antimony oxide acts with the halides to generate antimony trihalide or antimony oxyhalide which acts as the flame-retardant, as shown in Reaction Formulas 1 and 2.

<Reaction Formula 1>

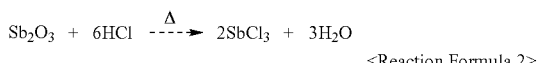

<Reaction Formula 2>

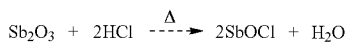

The content of the low-inflammability solvent in the electrolyte is preferably 1 volume % or more based on the total solvent, and more preferably 5 to 80 volume %. If the content of the low-inflammability solvent is less than 1 volume %, the desired effect cannot be realized.

The mole ratio of the low-inflammability solvent and the antimony oxide is preferably 1:0.01 to 1:1. If the mole ratio of the antimony oxide is less than these ranges, the effect of addition of the antimony oxide cannot be obtained, whereas if the mole ratio is more than these ranges, excess antimony oxide decreases the solubility of lithium ions to reduce ionic conductivity.

The electrolyte may further include a non-aqueous solvent which is known as an electrolytic solvent. The non-aqueous solvent preferably has a high dielectric constant in order to compensate the low dielectric constant of the low-inflammability solvent. Examples are ethyl carbonate, butyl carbonate, benzonitrile, acetonitrile, γ-butyrolactone, 4-methyldioxolane, N,N-dimethylformamide, dimethylacetamide, and dimethylsulfoxide.

The content of the low-inflammability solvent in the electrolyte is preferably 1 volume % or more based on the total solvent, and more preferably 5 to 80 volume %. If the content of the low-inflammability solvent is less than 1 volume %, the desired effect cannot be realized. If the low-inflammability is more than 80 volume %, the solubility of lithium salt decreases to reduce ionic conductivity of lithium ions.

Useful lithium salts include those selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (where x and y are natural numbers), LiCl, LiI, and mixtures thereof. In addition, the lithium salts may be $LiB(OCOCF_3)_4$.

The electrolyte is a liquid-type electrolyte, that is, an electrolytic solution, and it is immersed in a polymer selected from polyethylene oxide, polypropylene oxide, polyacrylonitrile, polyvinylidene fluoride, polymethacrylate, or polymethylmethacrylate, to make a polymer electrolyte.

Hereinafter, a method of fabricating a rechargeable lithium battery according to the present invention is described.

An electrolyte is prepared. The electrolyte includes a polyacrylate compound having at least three acryl groups, a low-inflammability solvent with a heat of combustion of 19,000 kJ/kg or less, and a lithium salt. The content of the low-inflammability solvent is 1 volume % or less based on the total solvent volume.

The electrolyte may be an electrolytic organic solution or a polymer electrolyte. The polymer electrolyte is prepared by immersing the electrolytic organic solution into a polymer. The electrolyte may further include a non-aqueous solvent or acrylonitrile in order to improve compatibility.

The amount of the polyacrylate compound to be added is preferably 0.01 to 10 wt %, and more preferably 0.1 to 5 wt %. The low-inflammability solvent is preferably 1 to 100 volume %.

The electrolyte is placed between a positive electrode and a negative electrode. In the case the electrolyte is liquid phase, the electrolyte is impregnated into a container enclosing the positive electrode, and the negative electrode, with a separator interposed between the negative and the positive electrodes. Whereas when the electrolyte is solid phase or semi-solid phase, the electrolyte is interposed between the positive electrode and the negative electrode without a separator.

Then, the electrolyte having at least the polyacrylate compound positioned between the negative electrode and the positive electrode is subjected to a heating step at a temperature of between 40 and 120° C. By heating the electrolyte, the polyacrylate compound is radically polymerized to form a polymer, and the polymer is immersed in the electrolytic organic solution. Further, the surface of the negative electrode adsorbs with some of the polyacrylate compound, or polyacrylate compound together with acrylonitrile.

When the heating is carried out at a temperature of less than 40° C., it is not preferable since the radical polymerization occurs insufficiently, and if the temperature is in excess of 120° C., it is not preferable since the electrolyte is denatured resulting in a deterioration of the battery characteristics.

In the assembly process, in the case of interposing the polymer electrolyte between the positive electrode and the negative electrode, the heating step may be omitted. The heating step may be also omitted in the case of employing the electrolyte essentially composed of the electrolytic organic solution.

When acrylonitrile along with the polyacrylate compound is added to the electrolytic organic solution, the organic layer including the polyacrylate compound and acrylonitrile is formed on the negative electrode. When acrylonitrile is included, the organic layer has improved ion conductivity and charge and discharge efficiency, since the internal impedance is decreased. Acrylonitrile is polymerized together with the polyacrylate compound to form the organic layer. Alternatively, acrylonitrile may be dissolved in the polymer of the polyacrylate compound to form the organic layer. Further, upon forming the organic layer, the contents of the polyacrylate compound and acrylonitrile are remarkably decreased in the electrolytic organic solution.

The organic layer prevents direct contact between the electrolyte and the negative electrode, thereby suppressing reductive decomposition of the electrolyte.

According to the method of fabricating a rechargeable lithium battery, the polyacrylate compound is radically polymerized by heating to provide a polymer, and at the same time, the polymer electrolyte is formed by impregnating the electrolytic organic solution into the polymer. The organic layer is thereby formed on the surface of the negative electrode before the resultant electrolyte is decomposed. Due to the organic layer, the decomposition of electrolyte is prevented on the surface of the negative electrode even if the charge voltage is increased following repeated charges. Accordingly, gas generation and denaturation of the electrolyte are advantageously prevented, and the charge and discharge capacity is not deteriorated, the cycle characteristics are improved, and deformation of the battery is prevented.

The following Examples further illustrate the present invention in detail, but are not to be construed to limit the scope thereof.

COMPARATIVE EXAMPLE 1

A sheet-type positive electrode having a $LiCoO_2$ positive active material and a sheet-type negative electrode having carbon fiber were wound to prepare an electrode element. The electrode element was inserted into a battery case, and 1.3M $LiPF_6$ in an electrolytic solvent of ethylene carbonate/diethylene carbonate (3/7 volume ratio) was inserted therein. As a result, a rectangular-type cell having a thickness of 4 mm, a width of 30 mm, and a height of 60 mm was fabricated.

EXAMPLE 1

A rectangular-type cell was fabricated by the same procedure as in Comparative Example 1, except that a mixed solvent of 85 volume % of a mixture of ethylene carbonate/diethylene carbonate (3/7 volume ratio) and 15 volume % of hexafluorobenzene ($C_6F_6$) was used as the electrolytic solvent.

EXAMPLE 2

A rectangular-type cell was fabricated by the same procedure as in Example 1, except that a mixed solvent of 85 volume % of a mixture of ethylene carbonate/diethylene carbonate (3/7 volume ratio) and 15 volume % of acetonitrile fluoride ($CH_2FCN$) was used as the electrolytic solvent.

EXAMPLE 3

A rectangular-type cell was fabricated by the same procedure as in Example 1, except that a mixed solvent of 90 volume % of a mixture of ethylene carbonate/diethylene carbonate (3/7 volume ratio) and 10 volume % of tri-fluorophthalic anhydride was used as the electrolytic solvent.

EXAMPLE 4

A rectangular-type cell was fabricated by the same procedure as in Example 1, except that a mixed solvent of 90 volume % of a mixture of ethylene carbonate/diethylene carbonate (3/7 volume ratio) and 10 volume % of phosphonitric hexafluoro trimer was used as the electrolytic solvent.

EXAMPLE 5

A rectangular-type cell was fabricated by the same procedure as in Example 1, except that a mixed solvent of 90 volume % of a mixture of ethylene carbonate/diethylene carbonate (3/7 volume ratio) and 10 volume % of hexafluoro phosphonate was used as the electrolytic solvent.

EXAMPLE 6

A rectangular-type cell was fabricated by the same procedure as in Example 1, except that antimony trioxide ($Sb_2O_3$) was added to the electrolyte and the added amount of antimony trioxide was 0.5M based on the amount of hexafluorobenzene ($C_6F_6$).

EXAMPLE 7

A rectangular-type cell was fabricated by the same procedure as in Example 2, except that antimony trioxide ($Sb_2O_3$) was added to the electrolyte and the added amount of antimony trioxide was 0.5M based on the amount of acetonitrile fluoride ($CH_2FCN$).

EXAMPLE 8

A rectangular-type cell was fabricated by the same procedure as in Example 3, except that antimony trioxide ($Sb_2O_3$) was added to the electrolyte and the added amount of antimony trioxide was 0.5M based on the amount of tri-fluorophthalic anhydride.

EXAMPLE 9

A rectangular-type cell was fabricated by the same procedure as in Example 4, except that antimony trioxide ($Sb_2O_3$) was added to the electrolyte and the added amount of antimony trioxide was 0.5M based on the amount of phosphonitric fluoride trimer.

EXAMPLE 10

A rectangular-type cell was fabricated by the same procedure as in Example 1, except that an acrylate compound represented by Formula 14 was further added to the electrolyte in the amount of 3 parts by volume based on 100 parts by volume of the total solvent.

EXAMPLE 11

A rectangular-type cell was fabricated by the same procedure as in Example 3, except that an acrylate compound represented by Formula 14 was further added to the electrolyte in the amount of 3 parts by volume based on 100 parts by volume of the total solvent.

EXAMPLE 12

A rectangular-type cell was fabricated by the same procedure as in Example 4, except that an acrylate compound represented by Formula 14 was further added to the electrolyte in the amount of 3 parts by volume based on 100 parts by volume of the total solvent.

EXAMPLE 13

A rectangular-type cell was fabricated by the same procedure as in Example 5, except that an acrylate compound represented by Formula 14 was further added to the electrolyte in the amount of 3 parts by volume based on 100 parts by volume of the total solvent.

EXAMPLE 14

A rectangular-type cell was fabricated by the same procedure as in Example 1, except that 10 volume % of a mixture of $CF_3CF_2CH_2Cl_2$ and $CClF_2CF_2CHClF$ (1:1 volume %) and a mixed solvent of 90 volume % of a mixture of ethylene carbonate/diethylene carbonate (3/7 volume ratio) was used as the electrolytic solvent, and an acrylate compound represented by Formula 14 was added to the electrolyte in the amount in the amount of 1 parts by volume based on 100 parts by volume of the total solvent.

(Coulomb curves of the cells according to Examples 1 to 5, and Comparative Example 1)

The cells according to Examples 1 to 5 and Comparative Example 1 were constant-current charged at 0.2 C until the voltage reached 4.2V, and then constant-voltage charged at 4.2V until the current reached 0.1 C. Then constant-current discharge was performed at 0.2 C by 2.75V. The coulomb efficiencies at initial charging were measured and the results are presented in FIG. 1.

As shown in FIG. 1, the decomposition peaks of the cells according to Examples 1 to 5 exhibited different potentials from that of Comparative Example 1. The cells according to Comparative Example 1 had a large decomposition peak because of the decomposition of ethylene carbonate at 3.3V, but the cells according to Examples 1 to 5 had no peak at 3.3V. It is predicted from these results that the cell according to Comparative Example 1 has the deteriorated discharge capacity and cycle life characteristics because of denaturation of the electrolyte caused by the decomposition of ethylene carbonate.

(Initial Charge and Discharge Capacity and Maximum Temperature at 3 C Overcharging of The Cells According to Examples 1 to 14 and Comparative Example 1)

The initial charge and discharge efficiency and maximum temperature at 3 C of the cells according to Examples 1 to 14 and Comparative Example 1 were measured and the results are presented in Table 6. The constant-current charging was performed at 0.2 C by 4.2V, and the constant-voltage charging was performed at 4.2V until the remaining current reached 0.1 C. The constant-current discharging was performed at 0.2 C by 2.75V.

TABLE 6

|  | 0.2 C Discharge capacity (mAh) | 1.0 C Discharge capacity (mAh) | Maximum temperature at 3.0 C overcharging (° C.) |
|---|---|---|---|
| Comparative Example 1 | 600 | 595 | Heat explosion |
| Example 1 | 598 | 585 | 96 |
| Example 2 | 597 | 586 | 103 |
| Example 3 | 581 | 550 | 83 |
| Example 4 | 563 | 532 | 65 |
| Example 5 | 596 | 589 | 81 |
| Example 6 | 593 | 579 | 92 |
| Example 7 | 590 | 577 | 75 |
| Example 8 | 576 | 510 | 57 |
| Example 9 | 555 | 512 | 73 |
| Example 10 | 598 | 586 | 92 |
| Example 11 | 598 | 590 | 110 |
| Example 12 | 582 | 540 | 85 |
| Example 13 | 575 | 550 | 71 |
| Example 14 | 592 | 580 | 77 |

What is claimed is:

1. An electrolyte comprising:
a solvent comprising a low-inflammability solvent with a heat of combustion of 19,000 kJ/kg or less, the low-inflammability solvent selected from the group consisting of an anhydrous halide represented by one selected from the group consisting of Formulas 3 to 5 and 7, a phosphonate halide represented by Formula 9 or 10, a butane substituted with two chlorides and five fluorides, and a combination thereof:

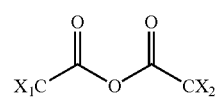

<Formula 3> where $X_1$ and $X_2$ of Formula 3 are independently selected from the group consisting of H, F, and Cl, and at least one of $X_1$ and $X_2$ of Formula 3 is selected from the group consisting of F and Cl,

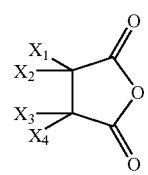

<Formula 4> where $X_1$ to $X_4$ of Formula 4 are independently selected from the group consisting of H, F, and Cl; and at least one of $X_1$ to $X_4$ of Formula 4 is selected from the group consisting of F and Cl,

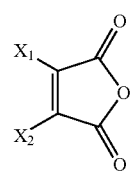

<Formula 5> where $X_1$ and $X_2$ of Formula 5 are independently selected from the group consisting of H, F, and Cl, and at least one of $X_1$ and $X_2$ Formula 5 is selected from the group consisting of F or Cl,

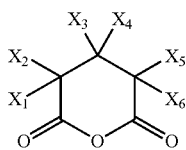
<Formula 7> where $X_1$ to $X_6$ of Formula 7 are independently selected from the group consisting of H, F, and Cl; and at least one of $X_1$ to $X_6$ of Formula 7 is selected from the group consisting of F and Cl;

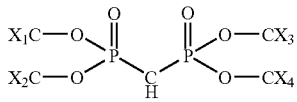
<Formula 9> where $X_1$ to $X_4$ of Formula 9 are independently selected from the group consisting of H, F, and Cl; and at least one of $X_1$ to $X_4$ of Formula 9 selected from the group consisting of F and Cl; and

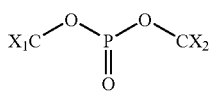
<Formula 10> where $X_1$ to $X_2$ of Formula 10 are independently selected from the group consisting of H, F, and Cl; and at least one of $X_1$ and $X_2$ of Formula 10 is selected from the group consisting of F and Cl; and
a lithium salt.

2. The electrolyte of claim 1, wherein the anhydrous halide is represented by Formula 3:

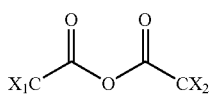
<Formula 3> where $X_1$ and $X_2$ of Formula 3 are independently selected from the group consisting of H, F, and Cl, and at least one of $X_1$ and $X_2$ of Formula 3 is selected from the group consisting of F and Cl.

3. The electrolyte of claim 1, wherein the butane substituted with two chlorides and five fluorides is represented by $CF_3CF_2CHCl_2$ or $CClF_2CF_2CHClF$.

4. The electrolyte of claim 1, further comprising antimony oxide represented by Formula 13, a mole ratio of the antimony oxide with the low-inflammability solvent being not less than 0.01:1:

$Sb_nO_m$ <Formula 13>

where n is 2, and m is 3 to 5.

5. A rechargeable lithium battery comprising:
a positive electrode in which lithium intercalation occurs;
a negative electrode in which lithium intercalation occurs; and
the electrolyte of claim 1.

6. The rechargeable lithium battery of claim 5, wherein the electrolyte further comprises a non-aqueous solvent, and the electrolyte includes the non-aqueous solvent at less than 99 volume % and the low-inflammability solvent at of 1 volume % or more.

7. The rechargeable lithium battery of claim 5 further comprising a polyacrylate compound.

8. The rechargeable lithium battery of claim 7, wherein the electrolyte includes 0.01 to 10 wt % of the polyacrylate compound.

9. The rechargeable lithium battery of claim 5 further comprising a polyacrylate compound and acrylonitrile.

10. The rechargeable lithium battery of claim 5, wherein the phosphonate halide is represented by Formula 9 or 10:

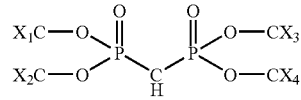
<Formula 9> where $X_1$ to $X_4$ of Formula 9 are independently selected from the group consisting of H, F, and Cl; and at least one of $X_1$ to $X_4$ of Formula 9 is selected from the group consisting of F and Cl, or

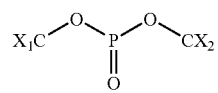
<Formula 10> where $X_1$ to $X_2$ of Formula 10 are independently selected from the group consisting of H, F, and Cl; and at least one of $X_1$ and $X_2$ of Formula 10 is selected from the group consisting of F and Cl.

11. The rechargeable lithium battery of claim 5, wherein the butane substituted with two chlorides and five fluorides is represented by $CF_3CF_2CHCl_2$ or $CClF_2CF_2CHClF$.

12. The rechargeable lithium battery of claim 5, wherein the electrolyte further comprises antimony oxide represented by Formula 13, a mole ratio of the antimony oxide with the low-inflammability solvent being not less than 0.01:1:

$Sb_nO_m$ <Formula 13>

where n is 2, and m is 3 to 5.

13. The rechargeable lithium battery of claim 5, wherein the electrolyte further comprises
a polymer derived from a polyacrylate compound coating a surface of the negative electrode.

14. The rechargeable lithium battery of claim 13, wherein the surface of the negative electrode organic layer is coated with an organic layer of both a polyacrylate compound and acrylonitrile.

15. The rechargeable lithium battery of claim 13, wherein the electrolyte further comprises a non-aqueous solvent, and the electrolyte includes the non-aqueous solvent of less than 99 volume % and the low-inflammability solvent of 1 volume % or more.

16. The rechargeable lithium battery of claim 13, wherein the butane substituted with two chlorides and five fluorides is represented by $CF_3CF_2CHCl_2$ or $CClF_2CF_2CHClF$.

17. The rechargeable lithium battery of claim 13, wherein the electrolyte further comprises antimony oxide represented by Formula 13, a mole ratio of the antimony oxide with the low-inflammability solvent being not less than 0.01:1:

$Sb_nO_m$ <Formula 13> where n is 2, and m is 3 to 5.

18. The electrolyte of claim 1, wherein the anhydrous halide is represented by Formula 4:

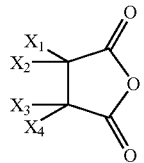

<Formula 4> where $X_1$ to $X_4$ of Formula 4 are independently selected from the group consisting of H, F, and Cl; and at least one of $X_1$ to $X_4$ of Formula 4 is selected from the group consisting of F and Cl.

19. The electrolyte of claim 1, wherein the anhydrous halide is represented by Formula 5:

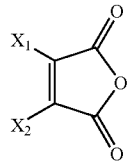

<Formula 5> where $X_1$ and $X_2$ of Formula 5 are independently selected from the group consisting of H, F, and Cl, and at least one of $X_1$ and $X_2$ Formula 5 is selected from the group consisting of F or Cl.

20. The electrolyte of claim 1, wherein the anhydrous halide is represented by Formula 7:

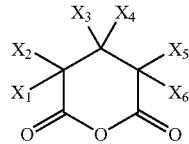

<Formula 7> where $X_1$ to $X_6$ of Formula 7 are independently selected from the group consisting of H, F, and Cl; and at least one of $X_1$ to $X_6$ of Formula 7 is selected from the group consisting of F and Cl.

\* \* \* \* \*